Patented Nov. 11, 1924.

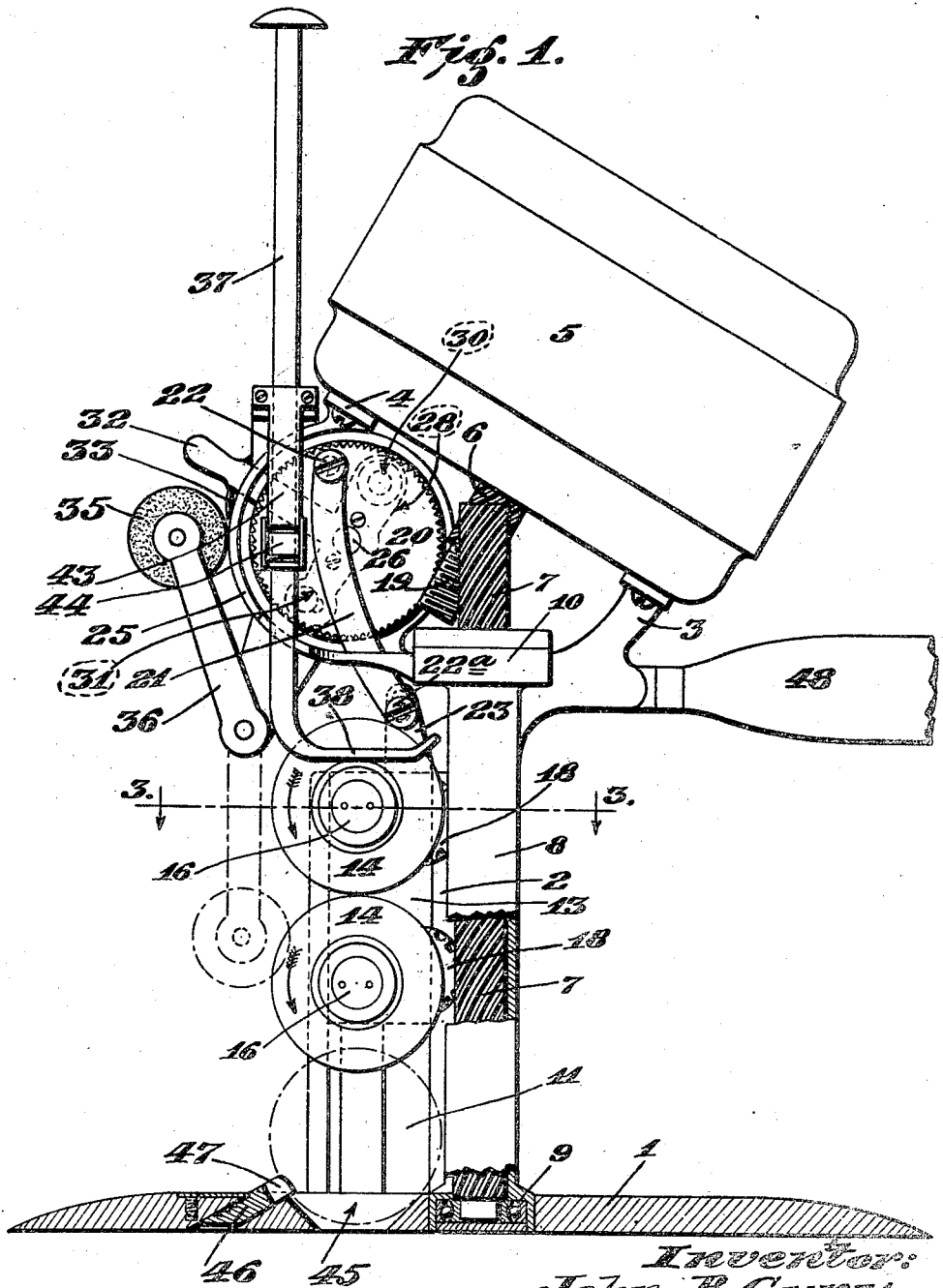

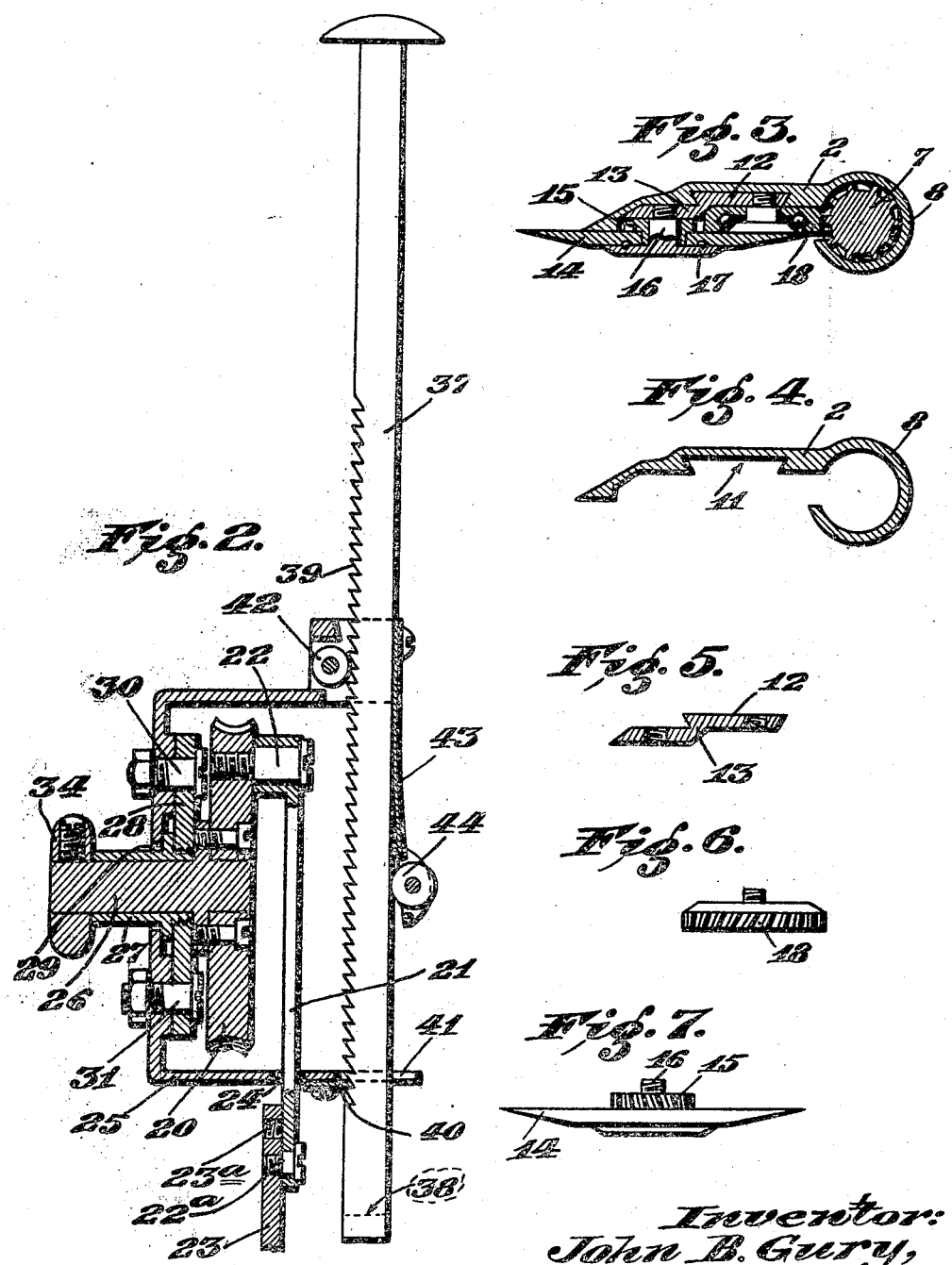

1,514,696

UNITED STATES PATENT OFFICE.

JOHN B. GURY, OF ST. LOUIS, MISSOURI.

CLOTH-CUTTING MACHINE.

Application filed March 15, 1920. Serial No. 365,804.

*To all whom it may concern:*

Be it known that I, JOHN B. GURY, a citizen of the United States, residing in the city of St. Louis and State of Missouri, have invented a new and useful Improvement in Cloth-Cutting Machines, of which the following is a specification.

This invention relates to cloth-cutting machines. It has for its objects to produce a novel structure having substantially all the advantages of both the reciprocatory knife-blade and rotary cutter types of machines of this character, but without the disadvantages of either. Other advantages to be attained will more fully appear in the following description.

In the usual rotary cutter type of machine the cutting disk is necessarily of relatively large diameter so as to cut through a comparatively thick pile of cloth. This type of cutter is advantageous in increased extent of cutting edge and speed in operation over the reciprocatory knife-blade type, but the latter is the more advantageous in following curved lines as it is capable of taking very sharp turns, and it also works with its cutting edge in a substantially vertical line so as to cut straight up and down through a pile of cloth, whereas with the circular cutter the cut is arcuate or deeper into the pile in a horizontal plane through the axis of the cutter than from the top and bottom thereof.

The present invention comprehends the utilization of a rotary cutter of relatively small diameter or a vertical series thereof mounted on a vertically reciprocating carrier. It further consists in the parts and combinations and arrangements of parts hereinafter described and pointed out in the appended claims.

In the accompanying drawings illustrating in a practical embodiment of the invention,—

Figure 1 is a view partly in side elevation and partly in vertical section of a complete machine;

Figure 2 is a fragmentary view partly in elevation and partly in section, showing the details of the presser bar and mechanism for reciprocating the carrier for the cutters;

Figure 3 is a section taken on or about the line 3—3 of Figure 1;

Figure 4 is a cross section of the standard;

Figure 5 is a cross section of the reciprocatory carrier for the cutters;

Figure 6 is an edge view of the intermediate gear for driving the cutter; and

Figure 7 is an edge view of the cutter with the driving pinion thereon.

Referring now to the drawings, the numeral 1 designates the usual base or foot plate having its edge portion tapered so that it may slide easily under the lowermost layer of a pile of cloth on a table.

Extending up from the base or foot plate is a standard 2 at the top of which are brackets 3, 4, to which an electric or other suitable motor 5 is attached. As shown, the motor is set at an angle and on its shaft is a spiral gear 6 which meshes with and drives a similarly threaded shaft 7 which is mounted in a cylindrical part 8 of the standard 2. This shaft 7 has a suitable anti-friction bearing 9 in the base or foot plate 1 and a similar bearing 10 at the upper end of the standard 2.

In the standard 2 is an undercut or dovetailed groove 11 (see Figure 4) in which works a counterpart portion 12 of a vertically reciprocating carrier 13. On this carrier is journalled a circular cutter 14 or a series thereof, usually two of them as shown.

As shown, the cutter has a pinion 15 fixed tight thereon and it rotates on a stud 16, there being a ball bearing 17 provided between the head of the stud and the cutter. The pinion is, of course, of the spiral tooth type, and it meshes with an intermediate gear 18 which latter in turn is in mesh with the spirally threaded shaft 7.

The shaft 7 which is driven by the gear 6 on the motor shaft drives the intermediate gear 18 and the latter drives the pinion 15 so that the cutters rotate in the direction of the arrows. By this arrangement the cutters are rotated at a high speed and in one direction while the carrier 13 is reciprocated vertically. The speed of the cutters varies, however, with respect to the speed of the shaft 7 on the up and down strokes of the carrier. That is, on the up stroke the speed of the cutters slackens slightly, but the loss is made up on the down stroke as the speed then proportionately increases.

The reciprocation of the carrier 13 is brought about in the following described manner. On the motor shaft is a worm screw 19 which drives a worm gear 20 to which a link 21 is pivotally attached, as at 22, whereby a crank motion is imparted to the link. The link is pivotally attached at its opposite end to an extension 23 of the carrier and works through a slot 24 in a circular housing 25 in which the worm gear 20 is located.

The worm gear 20 is secured to a spindle 26 which is journalled in a sleeve 27 carried by a supporting arm 28 and projecting outside the housing 25 through an enlarged aperture 29 in the latter so as to permit a limited swinging movement of the supporting arm. The supporting arm 28 is hinged on a stud 30 extending through an aperture in the housing (see Figure 2), and is provided at its opposite end with a slot through which another stud 31 is inserted and secured to the housing.

By shifting the supporting arm 28 on its pivot stud 30 the worm gear 20 may be moved into and out of engagement with the worm screw 19 at will. To facilitate the manipulation of the supporting arm it is provided with a lever extension 32 which projects to the outside through a suitable slot in the housing 25 so as to be conveniently grasped by the operator. Any suitable holding device may be provided on the lever extension, but, as shown, a friction or spring-pressed brake 33 is carried thereon so as to bear against the peripheral face of the housing 25.

By the arrangement for throwing the worm gear 20 out of engagement with the screw 19 the reciprocation of the carrier 13 may be stopped and started at will without stopping the rotation of the cutters. So, too, while the worm gear is out of mesh with the screw, the spindle 26 may be rotated by means of a knob 34 on the outer end thereof whereby to manually rotate the worm gear 20 and thereby shift the carrier 13 up or down so as to bring the cutters to the desired elevation. In this connection, it may be here stated that a suitable sharpening device 35 is movably mounted on a hinged arm 36 normally in a raised position out of the way but being capable of manipulation by the operator when swung down to a position as shown by the broken lines in Figure 1 of the drawings, and in cooperative relation to which the respective cutters may be brought by the manual operation of the carrier 13 as above described. This sharpening device per se, however, forms no part of the present invention aside from the particular combination as claimed. Generally stated, it comprises a disk of suitable abrasive material and is rotatably mounted on the arm 36.

A vertically adjustable presser bar 37 is mounted on the housing 25. As shown, it has an angular foot portion 38 to bear against the top of the pile of cloth close up to the path of the cutters. This bar 37 has a series of serrations or ratchet teeth 39 to engage a plate 40 at the end of a groove 41 in the housing 25 in which the bar slides. Above the plate 40 the bar 37 slides between a roller 42 and a spring 43 having a bearing roller 44 to engage the bar between the roller 42 and said plate 40. The spring 43 pressing the roller 44 against the bar holds the latter yieldably in contact with the plate 40. By this arrangement and owing to the formation of the ratchet teeth of the bar, the bar may be readily pressed downward upon the pile of cloth, but it is held normally against upward movement. To raise the bar it is only necessary to tilt it on the roller 42 and thereby move the portion below said roller outward against the resistance of the spring 43 sufficiently to disengage the ratchet teeth from the plate 40. After the bar is raised to the desired elevation the spring 43 is allowed to press the bar back into engagement with said plate 40.

In the base or foot plate 1 is provided a groove or slot 45 to receive the lower portion of the lower cutter when it descends to its lowermost position as shown by the circle in broken lines, and cooperating with said groove or slot is an inclined plate 46 having a slotted end portion 47. This plate is to deflect the lowermost layers of the cloth in the pile upward to a plane approaching relatively close to the axis of the cutter in its lowermost position. By having the cutter enter the slot 45 and providing the plate 46 there is but little overhang of the cutting edge of the cutter. Consequently, the cutting through the pile of cloth is substantially straight up and down.

The connection of the link 21 with the extension 23 of the carrier 13 is preferably made adjustable so as to compensate for the reduction in diameter of the cutting disks 14 when they are resharpened. This adjustment may be accomplished by providing two or more apertures 23$^a$ in the extension 23 of the carrier 13 for the reception of the pivot stud 22$^a$. In this way, the carrier can be lowered so that the lower cutter 14, when worn or ground away in the grinding operation for resharpening, will enter the slot 45 in the base or foot plate 1 to the same depth as originally, so as to cut clear through the bottom of the pile of cloth with the same effect as originally attained.

Obviously, by the provision of a rotary cutter of relatively small diameter on a vertically reciprocating carrier, practically all the disadvantages of the ordinary rotary cutter of larger diameter heretofore employed in machines of this character are overcome, while all the advantages of the usual reciprocatory cutter are retained. That is to say, a relatively large extent of cutting edge is provided, high speed in operation is attained, and the manipulation of the machine in following curved lines and particularly sharp turns is facilitated.

The machine may be provided with the usual handle 48 and such other adjuncts usually in the equipment of machines of this character. So, too, it is obvious that many changes and modifications may be made in the construction and arrangement of the machine without in the least departing from the spirit of the invention as defined by the appended claims. The machine, therefore, is not limited to the structure shown in the accompanying drawings.

What is claimed is:

1. In a cloth cutting machine, a supporting base adapted to travel under the lowermost layer of a pile of cloth, a standard thereon, a vertically reciprocatable carrier on said standard, a rotary cutter mounted on said carrier so as to be effective to cut in a vertical line, motor-driven means on said standard for reciprocating said carrier and means for at the same time rotating said cutter.

2. In a cloth cutting machine, a supporting base adapted to travel under the lowermost layer of a pile of cloth, a standard thereon, a vertically reciprocatable carrier on said standard, a rotary cutter mounted on said carrier so as to be effective to cut in a vertical line, means for rotating said cutter constantly in one direction during the reciprocation of said carrier, releasable motor-driven means for reciprocating said carrier, and means for manually reciprocating said carrier when said motor-driven means is released.

3. In a cloth cutting machine, a standard, a vertically reciprocatable carrier thereon, a rotary cutter mounted on said carrier so as to be effective to cut in a vertical line, a grinding element mounted on said standard so as to be moved into operable relation to said cutter, but being normally supported out of such relation, releasable motor-driven means for reciprocating said carrier, means for manually reciprocating said carrier when said motor-driven means is released, and means for rotating said cutter during the reciprocation of said carrier and also while said carrier is at any position of rest.

4. In a machine of the character described, a base plate, a vertically reciprocating carrier thereon, a series of rotary cutters on said carrier, means for reciprocating said carrier, means for simultaneously rotating said cutters during the reciprocation of said carrier, and means for deflecting the lowermost layers of a pile of cloth above said base plate upward towards the axis of the lowermost cutter in its lowermost position.

5. In a machine of the character described, a base plate, a standard thereon, a motor on said standard, a spirally gear-threaded shaft in said standard, a driving connection between said motor and said shaft, a vertically reciprocatory carrier on said standard, a rotary cutter on said carrier, a gearing between said cutter and said shaft whereby said cutter is rotated from said shaft during the reciprocation of said carrier, and means operated by said motor for actuating said carrier, said means being releasable from said motor and being capable of manual operation.

6. In a machine of the character described, a base plate, a standard thereon, a motor on said standard, a spirally gear-threaded shaft on said standard, a vertically movable carrier on said standard, a rotary cutter on said carrier, a gearing between said shaft and said cutter whereby said cutter is driven from said shaft in any position of said carrier, a driving connection between said motor and said shaft, a worm screw on the motor shaft, a worm gear mounted to be moved into and out of operable engagement with said worm screw, and a link and crank connection between said worm gear and said carrier.

7. In a machine of the character described, a base plate, a standard thereon, a motor on said standard, a spirally gear-threaded shaft on said standard, a vertically movable carrier on said standard, a rotary cutter on said carrier, a gearing between said shaft and said cutter whereby said cutter is driven from said shaft in any position of said carrier, a driving connection between said motor and said shaft, a worm screw on the motor shaft, a worm gear mounted to be moved into and out of operable engagement with said worm screw, and an adjustable link and crank connection between said worm gear and said carrier.

8. In a cloth cutting machine, a base plate, a vertically reciprocating and constantly rotating cutter in action, means for reciprocating said cutter, means for simultaneously rotating the same during reciprocation, said base plate having a slot to receive said cutter in its lowermost position during reciprocation, and an inclined deflector having a slot coinciding with the slot in said base plate and being adapted to direct the lowermost layers of a pile of cloth upward towards the axis of said cutter in the lowermost position of the latter.

JOHN B. GURY.